(12) United States Patent
Liu et al.

(10) Patent No.: US 12,399,756 B2
(45) Date of Patent: Aug. 26, 2025

(54) METHOD OF OPTIMIZING DEPENDENT TASK OFFLOADING IN INTERNET OF VEHICLES USING DEEP REINFORCEMENT LEARNING

(71) Applicant: HANGZHOU DIANZI UNIVERSITY, Hangzhou (CN)

(72) Inventors: Peng Liu, Hangzhou (CN); Fei Zhang, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 19/032,177

(22) Filed: Jan. 20, 2025

(65) Prior Publication Data
US 2025/0165311 A1    May 22, 2025

Related U.S. Application Data

(63) Continuation of application No. PCT/CN2024/081842, filed on Mar. 15, 2024.

(30) Foreign Application Priority Data

May 10, 2023  (CN) .................... 202310522700.6

(51) Int. Cl.
*G06F 9/50* (2006.01)
*G07C 5/00* (2006.01)

(52) U.S. Cl.
CPC .......... *G06F 9/5094* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 11,206,221 B1* | 12/2021 | Guo ................ | H04L 47/623 |
| 2021/0136142 A1* | 5/2021 | Dong ................ | G06F 9/5094 |
| 2022/0126725 A1* | 4/2022 | Wang ................ | B60L 53/63 |

FOREIGN PATENT DOCUMENTS

| | | |
|---|---|---|
| CN | 114116047 B | 3/2022 |
| CN | 116321298 A | 6/2023 |
| CN | 116455903 A | 7/2023 |
| WO | 2022027776 A1 | 2/2022 |

* cited by examiner

*Primary Examiner* — Eric C Wai
(74) *Attorney, Agent, or Firm* — Birchwood IP

(57) ABSTRACT

A method of optimizing dependent task offloading in an Internet of Vehicles using deep reinforcement learning is provided, including the following steps: S1: constructing a vehicle system network; S2: constructing a task model for an application program; S3: constructing a task load model: calculating delay, energy consumption and incentive compensation for local computing, offloading to nearby vehicles and offloading to nearby RSUs three offloading methods based on the vehicle network system and the task model, respectively; S4: determining task priorities: first determining the priorities of each of subtasks according to allocation of predecessor nodes of the subtasks combining with dynamic network environment, and then scheduling according to a multi-queue algorithm; and S5: finding an optimal offloading strategy by using the deep reinforcement learning.

9 Claims, 3 Drawing Sheets

METHOD OF OPTIMIZING DEPENDENT TASK OFFLOADING IN INTERNET OF VEHICLES USING DEEP REINFORCEMENT LEARNING

CROSS-REFERENCE TO RELATED APPLICATIONS

This application is a continuation of PCT/CN2024/081842, filed on Mar. 15, 2024 and claims priority of Chinese Patent Application No. 202310522700.6, filed on May 10, 2023, the entire contents of which are incorporated herein by reference.

TECHNICAL FIELD

The present disclosure relates to vehicle edge computing, and specifically relates to a method of optimizing dependent task offloading in an Internet of Vehicles using deep reinforcement learning.

BACKGROUND

With the dramatic growth in the number of vehicle users worldwide and the increasing demand for services from vehicle users, telematics networks have endured more business challenges such as high transmission bandwidth requirements of the network, high transmission reliability and strong data processing capabilities. Internet of vehicles (IoV) integrates traditional vehicle Ad Hoc Network and telematics, and thus can effectively improve vehicle service capability. In IOV, intelligent vehicles can execute a variety of applications, such as collision warning, autonomous driving, and auto-navigation. However, these applications require a large amount of computational and storage resources and have strong delay requirements. It is a challenging task to execute these applications on resource-limited vehicles under low delay constraints.

In-vehicle edge computing that integrates Mobile Edge Computing (MEC) into IoV is a promising solution to effectively address the above problems. In-vehicle edge computing may improve vehicle quality of service by deploying computation of MEC servers and storage resources in the vicinity of vehicles. Compute-intensive and delay-sensitive tasks may be loaded onto the MEC servers for execution over a wireless network. Although in-vehicle edge computing may reduce the delay of task execution, the edge servers have limited computation and storage capacity and thus cannot guarantee load balancing. Therefore, an effective offloading strategy may reduce the processing delay of tasks and improve the quality of service for users.

Current in-vehicle edge computing mainly study the computational optimization of individual tasks and lack consideration of the dependencies between tasks, and thus limits the application scope and effectiveness of in-vehicle edge computing technologies. In addition, considering the environmental protection factors, most vehicles are electric vehicles, and energy consumption is crucial for the use of electric vehicles. In practical applications, vehicles or infrastructures providing computing services usually require corresponding incentive compensation, but existing studies rarely focus on energy consumption in computing and corresponding incentive compensation. To address these issues, the present disclosure aims to minimize the energy consumption and the incentive compensation paid during computation while satisfying the demand for computation services of an application, and thereby improve the quality of service for the user. Specifically, the present invention proposes a system and method for optimizing the offloading of dependent tasks in the IOV using deep reinforcement learning, taking into account the dependency relationships between the tasks so as to ensure that the delay constraints are satisfied while minimizing the energy consumption in the computation process and the incentive compensation paid to the vehicle or infrastructure for the computation service. Specifically, the computational resources, energy costs and incentive compensation of vehicles and infrastructures are first mathematically modeled, and then corresponding task scheduling and offloading strategies are developed using deep reinforcement learning techniques and incorporating the dependencies between tasks. This ensures that the delay constraints are satisfied while minimizing the energy consumption in the computation process and the incentive compensation paid to the vehicles or infrastructures providing the computation services.

In summary, the present disclosure proposes a novel in-vehicle edge computing technology that may better solve the computational offloading problem of dependencies between tasks, energy costs and incentive compensation, and improve the efficiency and quality of computing services.

SUMMARY

An objective of the present disclosure to provide a method of optimizing dependent task offloading in an Internet of Vehicles using deep reinforcement learning, so as to overcome the shortcomings of the prior art.

In order to achieve the above objective, the present disclosure provides a method of optimizing dependent task offloading in an Internet of Vehicles using deep reinforcement learning, comprising the following steps:

S1: constructing a vehicle system network, wherein the vehicle system network comprises MEC servers, Road Side Units (RSUs) and vehicular user sides connected in sequence;

S2: constructing a task model for an application program, wherein tasks with temporal dependencies and data dependencies are modeled as a DAG task model;

S3: constructing a task load model: calculating delay, energy consumption and incentive compensation for local computing, offloading to nearby vehicles and offloading to nearby RSUs three offloading methods based on the vehicle network system and the task model, respectively;

S4: determining task priorities: first determining the priorities of each of subtasks according to allocation of predecessor nodes of the subtasks combining with dynamic network environment, and then scheduling according to a multi-queue algorithm; and S5: finding an optimal offloading strategy by using the deep reinforcement learning: each of the subtasks selects a corresponding execution device to complete the task offloading, so as to minimize energy consumption and paid incentive compensation under constraints of delay, and thereby improve quality of service for users.

Compared to the prior art, the present disclosure has the following technical effects.

This disclosure is applicable to V2I and V2V collaborative offloading scenarios in an IoV environment. The method decouples the nonlinear integer programming problem into two subproblems: the associated subtask scheduling problem and the task offloading problem. Combining the allocation of predecessor tasks of the subtasks and the dynamic network environment, the method prioritizes the set of ready subtasks and then solves the offloading problem using deep reinforcement learning based on value functions and policy functions. The method optimizes the task offloading problem, and minimizes the energy consumption during computation and the incentive compensation paid to the vehicles or infrastructures with the computation service, while ensuring task dependency and the constraints of delay. The present disclosure does not require excessive a priori knowledge, has good reusability in similar application scenarios, and thus is of high practical value.

The present disclosure provides a method for dependent task offloading in V2I and V2V collaborative edge computing based on deep reinforcement learning, effectively minimizes the weighted sum of the energy consumption and the incentive compensation paid to the client-side vehicle under the constraints of delay, and thereby improve the user experience. The process of the present disclosure is standardized, and is easy to operate. Moreover, the present disclosure also has strong practical value and reusability, and has a wide range of application prospects in similar application scenarios.

DETAILED DESCRIPTION OF THE EMBODIMENTS

The present disclosure is further described below in connection with the drawings and specific embodiments so that those skilled in the art may better understand the present disclosure and be able to allow implementation, but the cited implementations are not intended to be a limitation of the present disclosure.

An agent takes an action in the current state to obtain a reward from the environment, and then enters the next state. Through continuous interaction, the agent may gradually learn the optimal offloading strategy. In this process, the agent constantly updates its value function to better estimate the value of each action. At the same time, the agent also continuously adjusts strategy in order to better explore the search space and find the optimal offloading decision.

In order to minimize the weighted sum of energy consumption and incentive compensation while satisfying delay constraints in an IoV edge computing scenario combining Vehicle-To-Infrastructure (V2I) offloading and Vehicle-To-Vehicle (V2V) offloading, the present disclosure provides a method for dependent task offloading based on deep reinforcement learning.

The edge computing scenario described in the present disclosure refers to vehicle nodes in an IoV network communication system combining V2I offloading and V2V offloading. These vehicle nodes may carry out V2I communication with edge Mobile Edge Computing (MEC) servers and may carry out V2V communication with other vehicle nodes. In this scenario, the vehicle that generates the application program is called a client-side vehicle and the vehicles that provide computational services to the application program are called server-side vehicles. The application program includes a series of indivisible subtasks with temporal dependencies and data dependencies that can be represented using a directed acyclic graph (DAG). These subtasks can be executed locally, transferred to server-side vehicles for execution, or uploaded to Rode side Units (RSUs) next to the highway for execution. In order to achieve minimizing the weighted sum of energy consumption and incentive compensation in this scenario, this disclosure provides a method for dependent task offloading based on deep reinforcement learning, which requires very little a priori knowledge and simple interactions with the environment to gain learning experience and obtains a near-optimal solution for minimizing the weighted sum of energy consumption and incentive compensation.

Figure 3:
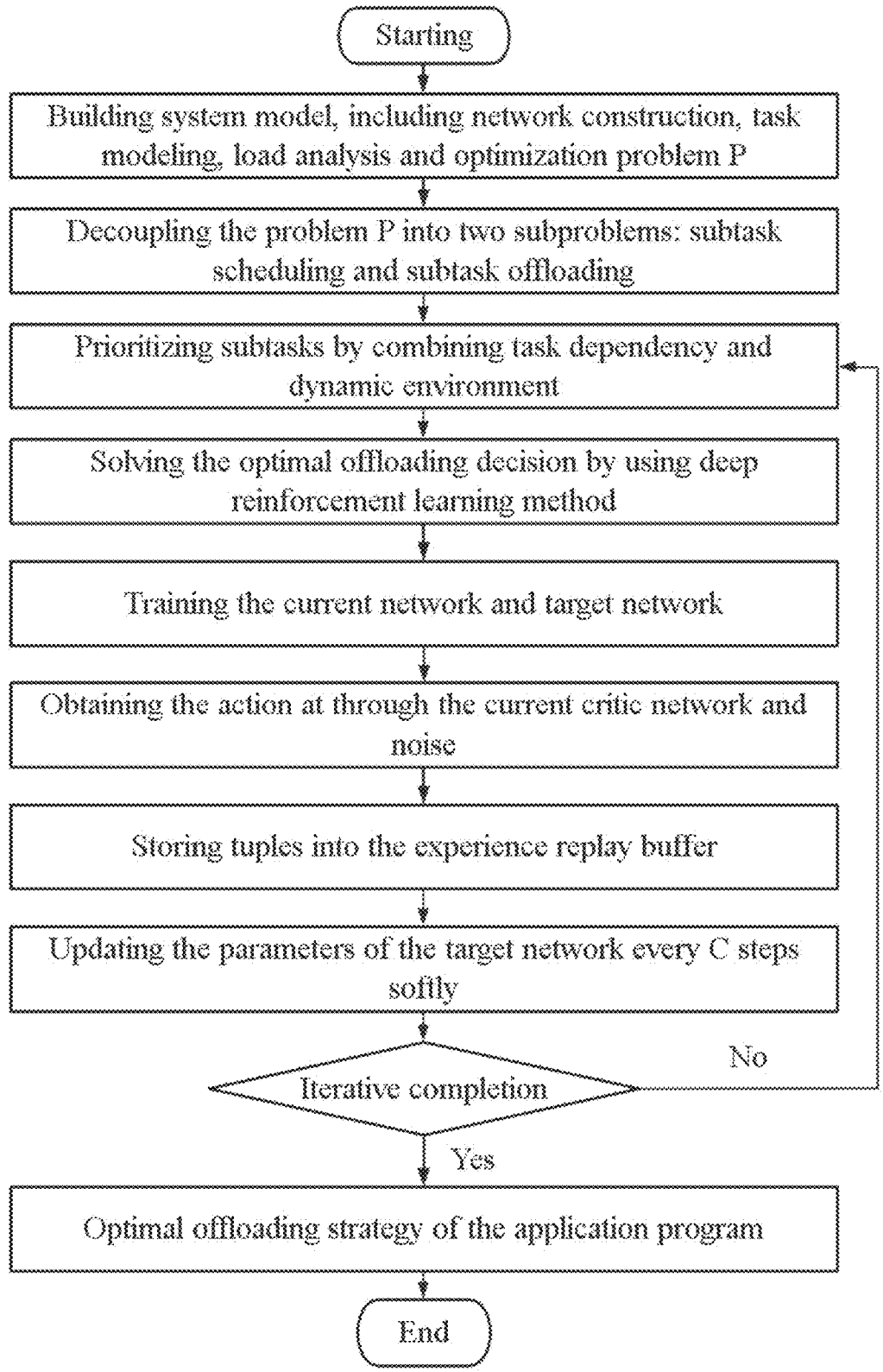
FIG. 3 is a flowchart based on deep reinforcement learning algorithm in an IoV scenario of the embodiment in this disclosure.

As shown in FIG. 3, the present disclosure provides a method of optimizing dependent task offloading in an IoV using deep reinforcement learning, including the following steps.

S1: Constructing a vehicle system network.

The proposed vehicle system network includes MEC servers, RSUs and vehicular user sides connected in sequence. A plurality of vehicle user sides is connected to each other via V2V transmission links to realize inter-vehicle communication and collaborative computing. Vehicle user sides and RSUs are connected via V2I transmission links to realize the communication between vehicles and the network. The MEC servers, as edge computing resource providers providing resources such as computation, storage and network, may provide edge computing services for the vehicle user sides. RSUs, as the infrastructures of the network, provide information such as network connection and road conditions and provide data and collaborative computation support for the vehicle user sides. The whole vehicle system network constitutes a distributed edge computing platform, and realizes cooperative computing and communication between vehicles and between vehicles and networks.

Figure 1:
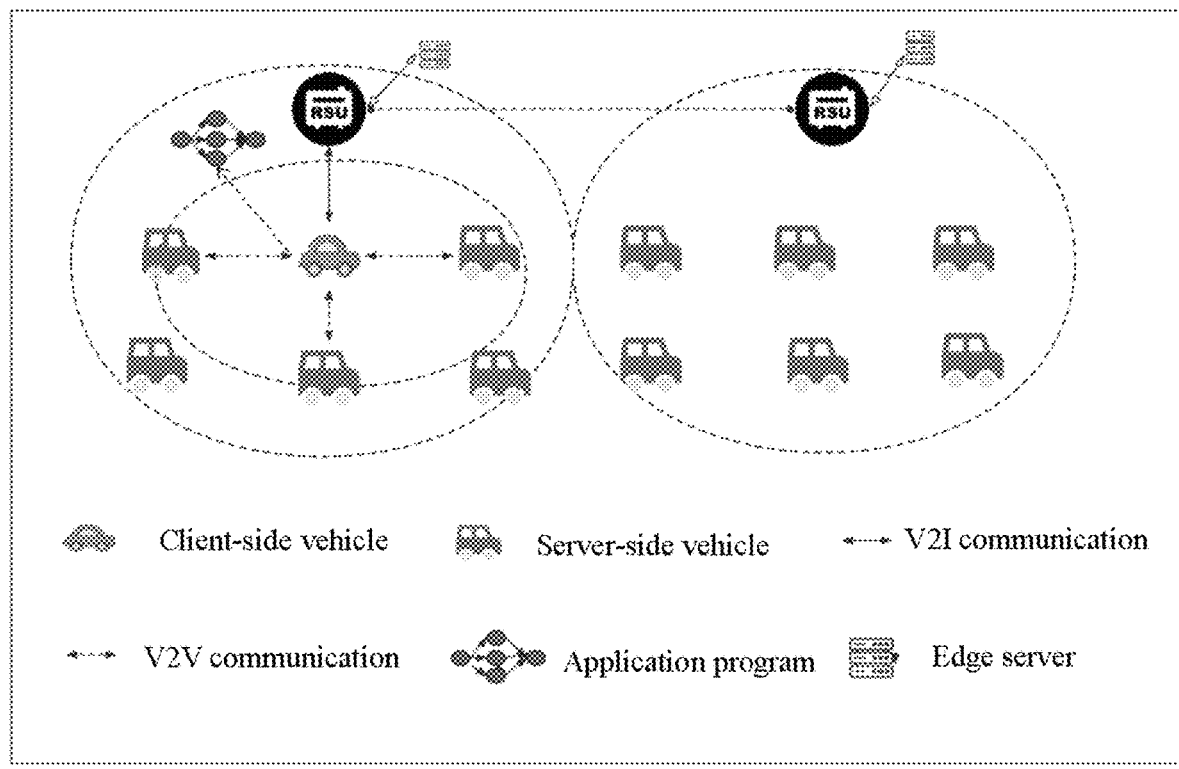
FIG. 1 is a schematic diagram of the V2I and V2V collaborative offloading model of the embodiment in this disclosure.

As shown in FIG. 1, in this scenario, according to roles in task processing, vehicles can be divided into a client-side vehicle and server-side vehicles. The data transmission links include V2V transmission links for task data, the upload links for task data to RSUs, the connection links between RSUs and servers, and the connection links between RSUs and RSUs. For the client-side vehicle, its tasks can be processed by the following three offloading methods: 1) Local computing: the client-side vehicle processes tasks by itself; 2) Offloading to nearby vehicles: the client-side vehicle uploads the tasks to neighboring server-side vehicles; 3) Offloading to nearby RSUs: the client-side vehicle uploads tasks to nearby RSUs.

S2: Constructing a task model for the application program:

Tasks with temporal dependencies and data dependencies are modeled as a DAG task model, and the DAG task is modeled as G=(V,E), where the vertex set V=$\{\phi_i|1 \le i \le N\}$, N denotes number of subtasks in V, the triad is defined as $\phi_i=(w_i, d_i, \tau_i)$, $w_i$, $d_i$, $\tau_i$ denote the computational workload, the data size, and the maximum completion time tolerance delay of the task $\phi_i$, respectively, E denotes the set of edges, and each edge $e_{\phi_i,\phi_j} \in E$ is a directed edge denoting the priority of the execution between them, indicating that the subtask $\phi_i$ needs to be completed before $\phi_j$ (which is equivalent to the fact that the output of $\phi_i$ is used as a part of the input of $\phi_j$). If an edge exists from $\phi_i$ to $\phi_j$, $\phi_i$ is call as an immediate predecessor of $\phi_j$; otherwise, $\phi_j$ is called an immediate successor of $\phi_i$. All predecessors need to be completed before their successors. A subtask without any predecessor node is a start node, also known as a source task, denoted as $\phi_{entry}$; a subtask without any successor node is an exit node, denoted as $\phi_{exit}$. With the DAG task model, the temporal dependencies and data dependencies between tasks can be clearly represented, which provides a basis for task scheduling.

S3: Constructing the task load model: based on the vehicle network system and the task model, calculating the delay, energy consumption and incentive compensation for the three offloading methods, namely, local computing, offloading to nearby vehicles, and offloading to nearby RSUs, respectively.

S301: Interdependent subtasks executed at different vehicle nodes require data transfer. Specifically, it takes some time to transfer the computation results of subtask $\phi_j$ executed on vehicle node m to subtask $\phi_i$ executed on vehicle node n, and this data transfer time is defined as follows:

$$TT_{\phi_j,\phi_i}(m, n) = \begin{cases} \frac{e_{\phi_j\phi_i}}{r_{mn}}, & e_{mn} \in E^{RSU_i} \\ \min\left(\frac{e_{\phi_j\phi_i}}{r_{mk}} + \frac{e_{\phi_j\phi_i}}{r_{kn}}\right), & e_{mk} \in E^{RSU_i} \text{ and } e_{kn} \in E^{RSU_i} \text{ and } e_{mn} \notin E^{RSU_i} \end{cases} \quad (1)$$

where k, m and n represent the labeling of the vehicle nodes respectively, $\phi_j$ is the predecessor node of subtask of $\phi_i$, $\tau_{mn}$ represents the transmission bandwidth between the vehicle node m to the vehicle node n, $e_{\phi_j\phi_i}$ denotes the data size of the dependent data of the subtasks $\phi_i$ to $\phi_j$, $e_{mn}$ denotes whether or not the vehicle nodes m and n are within the communication range, and $E^{RSU_i}$ denotes the set of edges established by vehicles through single-hop V2V communication within the communication range of road side unit $RSU_i$.

S302: Calculating the time to execute the task locally.

Specifically, for the case of executing the task locally, the completion time of the subtask $\phi_i$ includes the waiting time $t_i^{local,wait}$ and the compution time $t_i^{local,compution}$.

$$t_i^{local,complete} = t_i^{local,wait} + t_i^{local,compution}, \quad (2)$$

$$t_i^{local,compution} = \frac{w_i}{f_c}, \quad (3)$$

$$t_i^{local,wait} = \max\{avail(V_c), \max(TT_{\phi_j,\phi_i}(m, V_c))\}, \quad (4)$$

where $V_c$ denotes the client-side vehicle, $avail(V_c)$ denotes the time when the client-side vehicle finishes all the scheduled tasks, $w_i$ denotes the amount of computation required by the subtask $\phi_i$, and $f_c$ denotes the computational power of the client-side vehicle.

For the case of executing tasks on $RSU_j$, the completion time of subtask $\phi_i$ includes upload time $t_i^{RSU_j,upload}$, waiting time $t_i^{RSU_j,wait}$ and compution time $t_i^{RSU_j,compution}$ $$t_i^{RSU_j,complete} = t_i^{RSU_j,upload} + t_i^{RSU_j,wait} + t_i^{RSU_j,compution}, \quad (5)$$

$$t_i^{RSU_j,upload} = \frac{d_i}{r_{V_c,RSU_j}}, \quad (6)$$

$$t_i^{RSU_j,wait} = \max\{avail(RSU_j), \max(TT_{\phi_j,\phi_i}(m, RSU_j))\}, \quad (7)$$

$$t_i^{RSU_j,compution} = \frac{w_i}{f_{RSU_j}}, \quad (8)$$

where $r_{V_c,RSU_j}$ denotes the transmission rate between the client-side vehicle and the specified $RSU_j$, $d_i$ denotes the data size of the subtask $\phi_i$, and $f_{RSU_j}$ denotes the computational power of the road side unit $RSU_j$.

Similarly, the time to execute task on the server-side vehicles includes transmission time $t_i^{V_k,tans}$, waiting time $t_i^{V_k,wait}$ and compution time $t_i^{V_k,compution}$.

$$t_i^{V_k,complete} = t_i^{V_k,trans} + t_i^{V_k,wait} + t_i^{V_k,compution}, \quad (9)$$

$$t_i^{V_k,trans} = \frac{d_i}{r_{V_c,V_k}}, \quad (10)$$

$$t_i^{V_k,wait} = \max\{avail(V_k), \max(TT_{\phi_j,\phi_i}(m, V_k))\}, \quad (11)$$

$$t_i^{V_k,compution} = \frac{w_i}{f_k}, \quad (12)$$

where $r_{V_c,V_k}$ denotes the transmission rate between the client-side vehicle $V_c$ to the specified server-side vehicle $V_k$, and $f_k$ denotes the computational power of the server-side vehicle $V_k$.

S303: Calculating the energy consumption for executing tasks locally:

$$e_i^{local} = \xi(t_i^{local,compution})^{-2}(w_i)^3, \quad (13)$$

where $\xi$ is a coefficient related to the architecture of the computer chip, and there is no incentive compensation because it is executed locally;

calculating the energy consumption for executing the task at the RSUs:

$$e_i^{RSU_j} = p_{V_c} t_i^{RSU_j,upload}, \quad (14)$$

where p denotes the upload power, so the incentive compensation to be paid to the road side unit $RSU_j$ for processing subtask $\phi_i$ is as follows:

$$C_{RSU_j,\phi_i} = p_j t_i^{RSU_j,compution}, \quad (15)$$

where $p_j$ denotes the fee charged by the road side unit $RSU_j$ per unit time (s);

calculating the energy consumption for executing the task on the server-side vehicles:

$$e_i^{V_k} = p_{V_c} t_i^{V_k, trans}, \quad (16)$$

where the incentive compensation to be paid to the server-side vehicle k for processing the subtask $\phi_i$ is as follows:

$$C_{V_k, \phi_i} = w_i \phi_k \quad (17),$$

where $\rho_k$ denotes the fee charged by the server-side vehicle k per unit of resource (1G clocks).

S304: The time $t_i$, the energy consumption $e_i$ and the cost $c_i$ to be paid for executing a subtask $\phi_i$ are:

$$t_i = x_i^{local} t_i^{local, complete} + x_i^{RSU_j} t_i^{RSU_j, complete} + x_i^{V_k} t_i^{V_k, complete}, \quad (18)$$

$$e_i = x_i^{local} e_i^{local} + x_i^{RSU_j} e_i^{RSU_j} + x_i^{V_k} e_i^{V_k}, \quad (19)$$

$$c_i = x_i^{RSU_j} C_{RSU_j, \phi_i} + x_i^{V_k} C_{V_k, \phi_i}, \quad (20)$$

where $x_i^{local}$, $x_i^{RSU_j}$ and $x_i^{V_k}$ denote the offloading decisions of the subtasks, and the values of $x_i^{local}$, $x_i^{RSU_j}$ and $x_i^{V_k}$ take all 0 or 1, and only one of the three can take 1.

Total incentive compensation cost, i.e., the incentive compensation to be paid to the client-side vehicle to complete all tasks, is denoted as:

$$C(X) = \sum_{i=1}^{N} c_i, \quad (21)$$

Total energy consumption cost, i.e., the energy consumption of the client-side vehicle to complete all tasks, denoted as:

$$E(X) = \sum_{i=1}^{N} e_i, \quad (22)$$

where X denotes the offloading decision vector and N denotes the number of tasks.

These formulas describe the relationship between task offloading decisions, execution time, energy consumption, and incentive compensation, and can be used to optimize the task offloading scheme to minimize the total energy consumption and total incentive compensation.

S305: In order to make the optimal offloading decision, an optimization problem considering the energy consumption and incentive compensation for completing the tasks is created:

$$\mathcal{P}: \min_{x} \varphi(X) = \alpha C(X) + \beta E(X) \quad (23)$$

s.t. C1: $x_i^{local} + x_i^{RSU_j} + x_i^{V_k} = 1,$ $x_i^{local} \in \{0, 1\} \, x_i^{RSU_j} \in \{0, 1\} \, x_i^{V_k} \in \{0, 1\},$ $x_i^{local} \in \{0, 1\} \, x_i^{RSU_j} \in \{0, 1\} \, x_i^{V_k} \in \{0, 1\},$ C2: $t_i \leq \min(l_{c,k}, \tau_i), x_i^{V_k} = 1$ C3: $t_i \leq \min(l_{c,RSU_j}, \tau_i), x_i^{RSU_j} = 1$ C4: $\alpha + \beta = 1, \alpha > 0 \, \beta > 0$ where C(X) denotes the total incentive compensation cost, E(X) denotes the total computational cost, C1 denotes that each subtask has to be offloaded to a certain device, C2 and C3 denote that if a subtask is offloaded to server-side vehicles or RSUs, completion time cannot exceed the maximum allowable time thresholds $l_{c,k}$ or $l_{c,RSU_j}$, and C4 denotes that the weighted sum of energy consumption and incentive compensation is 1, and both must be positive number.

The optimization problem may be decomposed into two subproblems: task priority determination and offloading decision. First, the task priority determination is to determine the execution order of each subtask in order to satisfy the constraints of delay and task dependency. Then, the task scheduling order is used for offloading decisions, the deep reinforcement learning is used to decide whether each subtask is executed locally, offloaded to the RSUs, or offloaded to the server-side vehicles to minimize the weighted sum of energy consumption and incentive compensation.

S4: Determining task priority: first determining the priority of each subtask according to the allocation of the predecessor node of the subtask combining with the dynamic network environment, and then scheduling according to the multi-queue algorithm.

S401: Starting subtasks, assuming that $\text{Rank}^D(\phi_{ready})=0$, determining the priority of the successor subtasks based on the scheduling arrangement of the predecessor subtasks, determining the ranking of the existing subtasks $\phi_1 \in \phi_{ready}$, and computing the value of the dynamic down-ranking as follows:

$$\text{Rank}^D(\phi_i) = \max_{\phi_j \in pred(\phi_i)} \{\text{Rank}^D(\phi_j) + \overline{TT_{\phi_j, \phi_i}}^D\} + \overline{CT_{\phi_i}}^D. \quad (24)$$

where $pred(\phi_1)$ is the set of immediate predecessor nodes of subtask $\phi_i$, $\overline{CT_{\phi_i}}^D$ is the dynamic average compution time, which may be affected by the allocation of $\phi_j \in pred(\phi_i)$, $C^{VC}(\phi_i)$ denotes the set of candidate server-side vehicles or infrastructures that may execute subtask $\phi_i$, and $\phi_{ready}$ denotes the set of ready subtasks and is defined as follows:

$$\overline{CT_{\phi_i}}^D = \frac{\sum_{m \in C^{VC}(\phi_i)} CT(\phi_i, m)}{|C^{VC}(\phi_i)|} \quad \phi_i \in \phi_{ready}, \quad (25)$$

moreover, $\overline{TT_{\phi_j, \phi_i}}^D$ represents the dynamic average transmission time, which is also affected by the allocation of $\phi_j \in pred(\phi_i)$, and is defined as follows:

$$\overline{TT_{\phi_j, \phi_i}}^D = \frac{\sum_{m \in C^{VC}(\phi_i)} TT_{\phi_j, \phi_i}(n, m)}{|C^{VC}(\phi_i)|} \quad (26)$$

$\phi_i \in \phi_{ready} \phi_j \in pred(\phi_i).$

S402: Task scheduling depends not only on priority but also on dependencies between tasks. A subtask can only be executed when all its predecessor subtasks are completed. Therefore, it is necessary to maintain a queue of ready subtasks, $Q^{ready}$, and a queue of executing subtasks, $Q^{exe}$, along with a queue of computed subtasks, $Q^{finished}$, and a set of all subtasks in the application program, $T^{task}$.

Initially, $\phi_{entry}$ subtasks are placed into $Q^{ready}$ from the set $T^{task}$, the tasks in $Q^{ready}$ are sorted in ascending order according to the subtask priority determination formula, the queue head element is removed to place the tasks into the queue $Q^{exe}$ of executing subtasks, and if there are completed tasks in queue $Q^{exe}$, the completed tasks are placed into the $Q^{finished}$ queue. This may generate new ready subtasks, and if all predecessor node subtasks of a subtask $\phi_i$ in the set $T^{task}$ are in the queue $Q^{finished}$, the subtask $\phi_i$ becomes a ready subtask, which is placed in the queue $Q^{ready}$, and the above steps are repeated until the set $T^{task}$ is empty. In the whole process of subtask priority determination, the ready subtasks are dynamically determined according to the execution results of the subtask predecessor, and thus the priority of the ready subtasks is determined.

Figure 2:
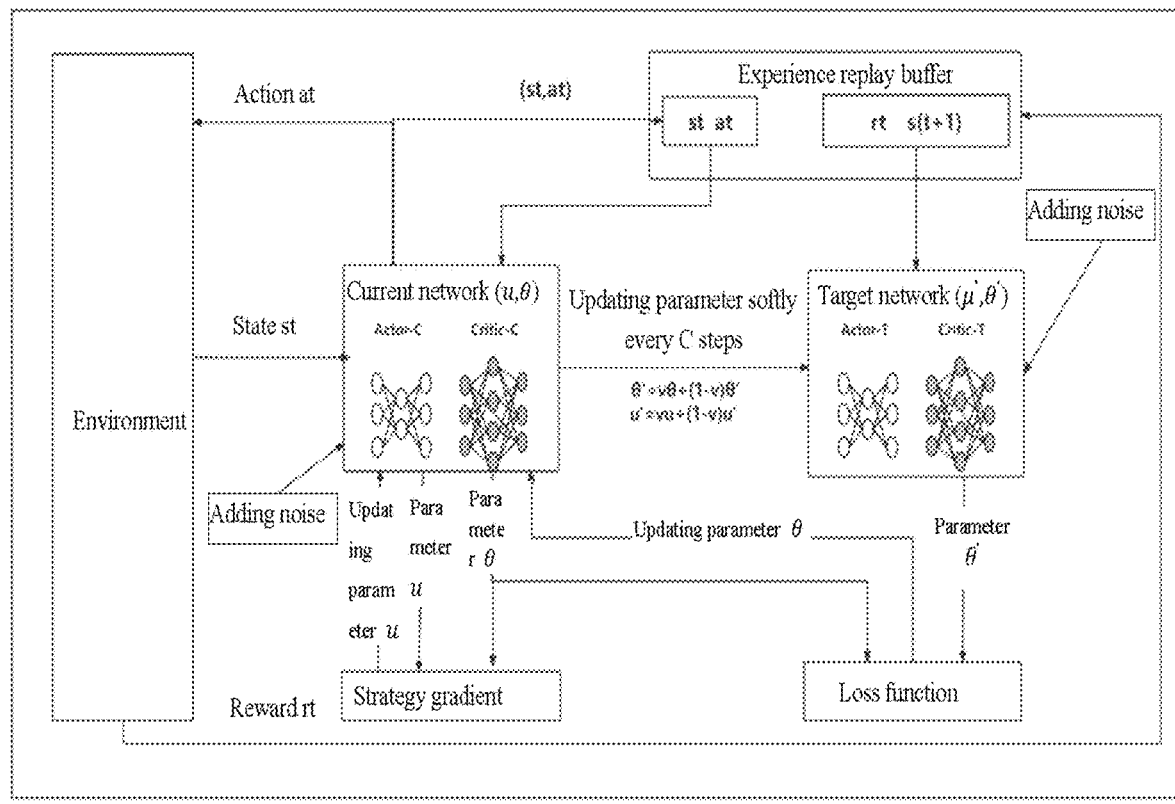
FIG. 2 shows the schematic diagram of the deep reinforcement learning algorithm of the embodiment in this disclosure.

S5: Finding the optimal offloading strategy by using deep reinforcement learning, each subtask selects the corresponding execution device to complete the task offloading, so as to minimize energy consumption and incentive compensation under constraints of delay, thereby improving the quality of service for users, as shown in FIG. 2.

In deep reinforcement learning methods, the design of actions, states, and reward values plays a crucial role. In order to adapt to the system environment and enable the agent to output the optimal action based on the current environmental state. The state space, action space, and reward function are designed as follows:

State space S: the state is represented in vector form, indicating the state of the client-side vehicle, including task information, location, available computing resources, and connection time. State space $S_t=\{T, N\}$, where T and N respectively represent the set of candidate vehicles and the set of ready subtasks available within the communication range of the road side unit $RSU_j$, $$T = (V^{RSU_j}), N = (w_i, \tau_i, succ(\phi_i), pred(\phi_i)), \quad (27)$$

Action space A: the action is a decision made by the requester through the offloading strategy π: A←S, and has a direct impact on the external environment. The action at time t is denoted as $A_t=\{x_i^{local}, x_i^{RSU_j}, x^{V_k}\}$, $x\_i\hat{}(V\_k)\}$, which is a one-hot encoding. The value of each element can be 0 or 1.

Reward function R: intuitively speaking, the Reward R←(S,A), the feedback obtained by the agent during the offloading process, directly determines the strategy. The optimization goal is to minimize energy consumption and overhead costs, but in reality, each decision can only serve one subtask. Therefore, the cost of one subtask m at time t is represented as $R_t(s, a)=-(e_i+c_i)$.

$$R_t(s, a) = \begin{cases} -e_i^{local}, & x_i^{local} = 1 \\ -\left(e_i^{RSU_j} + C_{RSU_j,\Phi_i}\right), & x_i^{RSU_j} = 1 \\ -\left(e_i^{V_k} + C_{V_k,\Phi_i}\right), & x_i^{V_k} = 1 \end{cases} \quad (28)$$

S501: Initializing the experience replay buffer and defining the maximum number of executions and initial episodes for training and evaluation.

S502: After initialization, initializing the parameters μ and θ of the current actor and current critic. This is because before starting training, the network parameters need to be initialized to some random values in order to avoid getting stuck in local optima during the learning process.

S503: Initializing the target actor's parameters μ'←μ and the target critic parameters θ'←θ separately. These networks are used during the algorithm training process to calculate TD errors and update the parameters of the current network.

S504: Obtaining the initial state $s_t$ of the environment is an important step in the algorithm. At the same time, it is necessary to prepare the initial random noise $n_t$ for action exploration. Through such exploration, more pairs of states and actions can be discovered, and the network can better converge to the optimal solution.

S505: From time t=1 until t=n (where n represents the number of indivisible subtasks in the application program). $a_t$ is obtained based on the output of the Actor-C network of the current network and the random noise $n_t$:

$$a_t = \varphi_\mu(s_t) + n_t, \quad (29)$$

S506: Executing action $a_t$, receiving reward $r_t$, and the environment state changing to $s_{t+1}$.

S507: Storing $(s_t, a_t, r_t, s_{t+1})$ in the experience replay buffer, utilizing the historical data in the experience replay buffer for offline training and improving the stability and robustness of the model.

S508: Sampling N tuples $\{(s_t, a_t, r_t, s_{t+1})\}$ from the experience replay buffer for training the target network and updating the current network, where usually, random sampling is used to ensure the randomness of the sample.

S509: Using the target network to calculate the target value for each tuple $y_t$, where $y_t$ is a value related to the current state $s_t$ and action $a_t$, $y_t$ includes the current reward $r_t$ and the target predicted value of the next state $s_{t+1}$. Specifically, the target value is calculated using the following formula:

$$y_t = r_t + \gamma \vartheta_{\theta'}(s_{t+1}, \varphi_{\mu'}(s_{t+1})), \quad (30)$$

where γ is the discount factor, $\vartheta_{\theta'}$ is the target critic, $\varphi_{\mu'}$ is the target actor, and these network parameters are initialized in S503.

S510: updating the parameter θ of the current critic by minimizing target loss L(θ), where L(θ) is calculated from the mean squared error (MSE) loss function as follows:

$$L(\theta) = \frac{1}{N}\sum_{i=1}^{N}(y_i - \vartheta_\theta(s_i, a_i | \theta)^2), \quad (31)$$

where N is the number of tuples sampled from the experience replay buffer, $y_i$ is the target value, $\vartheta(s_i, a_i|\theta)$ is the output value of the current critic, and this MSE loss function is a common supervised learning loss function that can reflect the fitting ability of the current critic and help the network better adapt to the target value $y_i$.

S511: Updating the Actor of the current network by calculating the sampled policy gradient, where Q(s,a|θ) represents the predicted values of the current critic for state s and action a, $\nabla_a Q(s,a|\theta)$ represents the action gradient on the predicted values, $\varphi_\mu(s|p)$ represents the action output of the current actor for state s, $\nabla_\mu \varphi_\mu(s|\mu)$ represents the parameter gradient for the action output. The calculation formula for the gradient of this strategy is a Monte Carlo method that estimates the expected value using sampled tuple data.

$$\nabla_u J \approx \frac{1}{N} \sum_{i=1}^{N} (\nabla_a Q(s, a \mid \theta) \mid_{s=s_i, a=\varphi_u(s_i)}, \nabla_u \varphi_u(s \mid \mu) \mid_{s=s_i}), \quad (32)$$

S512: if the current iterative times t can be divided by C, i.e. t % C=0, updating the network parameters, where θ' and u' respectively represent the parameters of the target critic and the target actor, and v is a hyperparameter less than 1 used for smoothly updating:

$$\theta' = v\theta + (1 - v)\theta', \quad (33)$$

$$u' = vu + (1 - v)u', \quad (34)$$

S513: t=t+1, repeating S505 to S512.

S514: If the current iterative times t is equal to n, that is, the maximum execution count has been reached, then episode=episode+1, then repeating S504 to S513 until the training process is complete and the optimal offloading strategy is obtained.

It should be noted that the parts not elaborated in this description belong to the existing technology. Relevant technical personnel should understand that the above implementation is only intended to assist readers in understanding the principles and implementation methods of this disclosure, and the scope protected by this disclosure is not limited to such embodiments. Any equivalent substitution made on the basis of this disclosure is within the scope of protection of the rights of this disclosure.

What is claimed is:

1. A method of optimizing dependent task offloading in an Internet of Vehicles using deep reinforcement learning, comprising the following steps:
   S1: constructing a vehicle system network, wherein the vehicle system network comprises Mobile Edge Computing (MEC) servers, Road Side Units (RSUs) and vehicular user sides connected in sequence;
   S2: constructing a task model for an application program, wherein tasks with temporal dependencies and data dependencies are modeled as a directed acyclic graph (DAG) task model;
   S3: constructing a task load model: calculating delay, energy consumption and incentive compensation for local computing, wherein a client-side vehicle processing tasks by itself, the client-side vehicle uploading the tasks to neighboring server-side vehicles, or the client-side vehicle uploading tasks to nearby RSUs based on the vehicle network system and the task model, respectively;
   S4: determining task priorities: first determining the priorities of each of subtasks according to allocation of predecessor nodes of the subtasks combining with dynamic network environment, and then scheduling according to a multi-queue algorithm; and
   S5: finding an optimal offloading strategy by using the deep reinforcement learning: each of the subtasks selects a corresponding execution device to complete the task offloading, so as to minimize energy consumption and paid incentive compensation under constraints of delay, and thereby improve quality of service for users;
   wherein in S2, constructing the task model for the application program comprises as follows:
   the tasks with the temporal dependencies and the data dependencies are modeled as the DAG task model, and the DAG task is modeled as G=(V,E), wherein a vertex set V={$\phi_i$|1≤i≤N}, N denotes a number of the subtasks in V; a triad is defined as $\phi_i=(w_i, d_i, \tau_i)$ wherein $w_i$, $d_i$, $\tau_i$ denote a computational workload, a data size, and a maximum completion time tolerance delay of the tasks $\phi_i$, respectively; E denotes a set of edges, and each of the edges $e_{\phi_i,\phi_j} \in E$ is a directed edge denoting the priorities of execution between the edges, indicating that the subtasks $\phi_i$ need to be completed before $\phi_j$, and output of $\phi_i$ is used as a part of input of $\phi_j$; if an edge exists from $\phi_i$ to $\phi_j$, $\phi_i$ is call as immediate predecessors of $\phi_j$; otherwise, $\phi_j$ is called immediate successors of $\phi_i$; all the predecessors need to be completed before successors; a subtask without any predecessor node is a start node, also known as a source task, denoted as $\phi_{entry}$; a subtask without any successor node is an exit node, denoted as $\phi_{exit}$; by the DAG task model, the temporal dependencies and data dependencies between the tasks are clearly represented, and a basis for task scheduling is provide.

2. The method of optimizing dependent task offloading in an Internet of Vehicles using deep reinforcement learning according to claim 1, wherein S3 comprises the following steps:
   S301: interdependent subtasks executed at different vehicle nodes require data transfer;
   S302: calculating time for executing the tasks locally;
   S303: calculating the energy consumption for executing the tasks locally;
   S304: time $t_i$, energy consumption $e_i$ and cost $c_i$ to be paid for executing a subtask $\phi_i$; and
   S305: creating an optimization problem considering the energy consumption and the incentive compensation for completing the tasks, so as to make an optimal offloading decision.

3. The method of optimizing dependent task offloading in an Internet of Vehicles using deep reinforcement learning according to claim 2, wherein S301 comprises as follows:
   there is some time to transfer computation results of the subtask $\phi_j$ executed on the vehicle node m to subtask $\phi_i$ executed on the vehicle node n, and the data transfer time is defined as follows:

$$TT_{\phi_j,\phi_i}(m, n) = \begin{cases} \dfrac{e_{\phi_j\phi_i}}{r_{mn}}, & e_{mn} \in E^{RSU_i} \\ \min\left(\dfrac{e_{\phi_j\phi_i}}{r_{mk}} + \dfrac{e_{\phi_j\phi_i}}{r_{kn}}\right), & e_{mk} \in E^{RSU_i} \text{ and } e_{kn} \in E^{RSU_i} \text{ and } e_{mn} \notin E^{RSU_i} \end{cases} \quad (1)$$

wherein k, m and n represent labeling of the vehicle nodes respectively, $\phi_j$ is the predecessor node of subtask of $\phi_i$, $r_{mn}$ represents a transmission bandwidth between the vehicle node m to the vehicle node n, $e_{\phi_i,\phi_i}$ denotes a data size of dependent data of the subtasks $\phi_i$ to $\phi_j$, $e_{mn}$ denotes whether or not the vehicle node m and the vehicle node n are within a communication range, and $E^{RSU_i}$ denotes the set of the edges established by the vehicles through single-hop V2V communication within the communication range of a road side unit $RSU_i$.

4. The method of optimizing dependent task offloading in an Internet of Vehicles using deep reinforcement learning according to claim 2, wherein S302 comprises as follows:

for a case of executing the tasks locally, a completion time of the subtask $\phi_i$ comprises a waiting time $t_i^{local,wait}$ and a computation time $t_i^{local,compution}$:

$$t_i^{local,complete} = t_i^{local,wait} + t_i^{local,compution}, \quad (2)$$

$$t_i^{local,compution} = \frac{w_i}{f_c}, \quad (3)$$

$$t_i^{local,wait} = \max\{\text{avail}(V_c), \max(TT_{\phi_j,\phi_i}(m, V_c))\}, \quad (4)$$

wherein $V_c$ denotes a client-side vehicle, $\text{avail}(V_c)$ denotes a time when the client-side vehicle finishes all the scheduled tasks, $w_i$ denotes an amount of computation required by the subtask $\phi_i$, and $f_c$ denotes a computational power of the client-side vehicle;

for a case of executing the tasks on $RSU_j$, the completion time of subtask $\phi_i$ comprises an upload time $t_i^{RSU_j,upload}$, a waiting time $t_i^{RSU_j,wait}$ and a computation time $t_i^{RSU_j,compution}$:

$$t_i^{RSU_j,complete} = t_i^{RSU_j,upload} + t_i^{RSU_j,wait} + t_i^{RSU_j,compution}, \quad (5)$$

$$t_i^{RSU_j,upload} = \frac{d_i}{r_{V_c,RSU_j}}, \quad (6)$$

$$t_i^{RSU_j,wait} = \max\{\text{avail}(RSU_j), \max(TT_{\phi_j,\phi_i}(m, RSU_j))\}, \quad (7)$$

$$t_i^{RSU_j,compution} = \frac{w_i}{f_{RSU_j}}, \quad (8)$$

wherein $r_{V_c,RSU_j}$ denotes a transmission rate between the client-side vehicle and the specified $RSU_j$, $d_i$ denotes the data size of the subtask $\phi_i$, and $f_{RSU_j}$ denotes a computational power of the road side unit $RSU_j$;

the time to execute tasks on the server-side vehicles comprises a transmission time $t_i^{V_k,trans}$, a waiting time $t_i^{V_k,wait}$ and a computation time $t_i^{V_k,compution}$:

$$t_i^{V_k,complete} = t_i^{V_k,trans} + t_i^{V_k,wait} + t_i^{V_k,compution}, \quad (9)$$

$$t_i^{V_k,trans} = \frac{d_i}{r_{V_c,V_k}}, \quad (10)$$

$$t_i^{V_k,wait} = \max\{\text{avail}(V_k), \max(TT_{\phi_j,\phi_i}(m, V_k))\}, \quad (11)$$

$$t_i^{V_k,compution} = \frac{w_i}{f_k}, \quad (12)$$

wherein $r_{V_c,V_k}$ denotes a transmission rate between a client-side vehicle $V_c$ to a specified server-side vehicle $V_k$, and $f_k$ denotes a computational power of the server-side vehicle $V_k$.

5. The method of optimizing dependent task offloading in an Internet of Vehicles using deep reinforcement learning according to claim 4, wherein S303 comprises as follows:

$$e_i^{local} = \xi(t_i^{local,compution})^{-2}(w_i)^3, \quad (13)$$

wherein $\xi$ is a coefficient related to an architecture of a computer chip;

calculating the energy consumption for executing the tasks at the RSUs:

$$e_i^{RSU_j} = p_{V_c} t_i^{RSU_j,upload}. \quad (14)$$

wherein p denotes an upload power, so the incentive compensation to be paid to the road side unit $RSU_j$ for processing the subtask $\phi_i$ is as follows:

$$C_{RSU_j,\Phi_i} = p_j t_i^{RSU_j,compution}, \quad (15)$$

wherein $p_j$ denotes a fee charged by the road side unit $RSU_j$ per unit time (s);

calculating the energy consumption for executing the tasks on the server-side vehicles:

$$e_i^{V_k} = p_{V_c} t_i^{V_k,trans}, \quad (16)$$

wherein the incentive compensation to be paid to the server-side vehicle k for processing the subtask $\phi_i$ is as follows:

$$C_{V_k,\Phi_i} = w_i \rho_k, \quad (17)$$

wherein $\rho_k$ denotes a fee charged by the server-side vehicle k per unit of resource.

6. The method of optimizing dependent task offloading in an Internet of Vehicles using deep reinforcement learning according to claim 5, wherein in S304, the time $t_i$, the energy consumption $e_i$ and the cost $c_i$ to be paid for executing the subtask $\phi_i$ are:

$$t_i = x_i^{local} t_i^{local,complete} + x_i^{RSU_j} t_i^{RSU_j,complete} + x_i^{V_k} t_i^{V_k,complete}, \quad (18)$$

$$e_i = x_i^{local} e_i^{local} + x_i^{RSU_j} e_i^{RSU_j} + x_i^{V_k} e_i^{V_k}, \quad (19)$$

$$c_i = x_i^{RSU_j} C_{RSU_j,\Phi_i} + x_i^{V_k} C_{V_k,\Phi_i}, \quad (20)$$

wherein $x_i^{local}$, $x_i^{RSU_j}$ and $x_i^{V_k}$ denote offloading decisions of the subtasks, and values of $x_i^{local}$, $x_i^{RSU_j}$ and $x_i^{V_k}$ take all 0 or 1, and only one of the three take 1;

a total incentive compensation cost, the incentive compensation to be paid to the client-side vehicle to complete all the tasks, is denoted as:

$$C(X) = \sum_{i=1}^{N} c_i, \quad (21)$$

a total energy consumption cost, the energy consumption of the client-side vehicle to complete all the tasks, denoted as:

$$E(X) = \sum_{i=1}^{N} e_i, \quad (22)$$

wherein X denotes an offloading decision vector and N denotes a number of the tasks;

these formulas describe a relationship between the task offloading decisions, the execution time, the energy consumption and the incentive compensation, and may be used to optimize the task offloading to minimize the total energy consumption and total incentive compensation.

7. The method of optimizing dependent task offloading in an Internet of Vehicles using deep reinforcement learning according to claim 6, wherein in S305, the optimization problem considering the energy consumption and the incentive compensation for completing the tasks is created:

$$\mathcal{P}: \min_X \varphi(X) = \alpha C(X) + \beta E(X) \quad (23)$$

$$\text{s.t. } C1: x_i^{local} + x_i^{RSU_j} + x_i^{V_k} = 1,$$

$$x_i^{local} \in \{0, 1\} x_i^{RSU_j} \in \{0, 1\} x_i^{V_k} \in \{0, 1\},$$

$$C2: t_i \le \min(l_{c,k}, \tau_i), x_i^{V_k} = 1$$

$$C3: t_i \le \min(l_{c,RSU_j}, \tau_i), x_i^{RSU_j} = 1$$

$$C4: \alpha + \beta = 1, \alpha > 0, \beta > 0$$

wherein C(X) denotes the total incentive compensation cost, E(X) denotes a total computational cost, C1 denotes that each of the subtasks has to be offloaded to a certain device, C2 and C3 denote that if the subtasks are offloaded to server-side vehicles or RSUs, the completion time cannot exceed maximum allowable time thresholds $l_{c,k}$ or $l_{c,RSU_j}$, and C4 denotes that a weighted sum of the energy consumption and the incentive compensation is 1, and both are positive numbers;

the optimization problem is decomposed into two subproblems: task priority determination and offloading decisions; firstly, the task priority determination is to determine an execution order of each of the subtasks, so as to satisfy the constraints of the delay and task dependency; then, a task scheduling order is used for the offloading decisions, the deep reinforcement learning is used to decide whether each of the subtasks is executed locally computation, offloaded to the RSUs, or offloaded to the server-side vehicles to minimize the weighted sum of the energy consumption and the incentive compensation.

8. The method of optimizing dependent task offloading in an Internet of Vehicles using deep reinforcement learning according to claim 7, wherein S4 comprises the followings steps:

S401: starting the subtasks, assuming that $\text{Rank}^D(\phi_{ready}) = 0$, determining the priority of the successor subtasks based on scheduling arrangement of the predecessor subtasks, determining a ranking of the existing subtasks $\phi_i \in \phi_{ready}$, and computing a value of dynamic downranking as follows:

$$\text{Rank}^D(\phi_i) = \max_{\phi_j \in pred(\phi_i)} \{\text{Rank}^D(\phi_j) + \overline{TT_{\phi_j, \phi_i}}^D\} + \overline{CT_{\phi_i}}^D, \quad (24)$$

wherein pred($\phi_i$) is a set of the immediate predecessor nodes of the subtask $\phi_i$, $\overline{CT_{\phi_i}}^D$ is a dynamic average computation time, and is affected by the allocation of $\phi_j \in pred(\phi_i)$, $C^{VC}(\phi_i)$ denotes a set of the candidate server-side vehicles or infrastructures executing the subtask $\phi_i$, and $\phi_{ready}$ denotes a set of ready subtasks and is defined as follows:

$$(\overline{CT_{\phi_i}})^D = \frac{\sum_{m \in C^{VC}(\phi_i)} CT(\phi_i, m)}{|C^{VC}(\phi_i)|} \quad \phi_i \in \phi_{ready}, \quad (25)$$

$\overline{TT_{\phi_j, \phi_i}}^D$ represents a dynamic average transmission time, is also affected by the allocation of $\phi_j \in pred(\phi_i)$, and is defined as follows:

$$(\overline{TT_{\phi_j, \phi_i}})^D = \frac{\sum_{m \in C^{VC}(\phi_i)} TT_{\phi_j, \phi_i}(n, m)}{|C^{VC}(\phi_i)|} \quad (26)$$

$$\phi_i \in \phi_{ready}, \phi_j \in pred(\phi_i);$$

S402: the task scheduling depends not only on the priority but also on the dependencies between the tasks; one subtask is executed only when all its predecessor subtasks are completed; therefore, it is necessary to maintain a queue of the ready subtasks, $Q^{ready}$, and a queue of executing the subtasks, $Q^{exe}$, along with a queue of computed subtasks, $Q^{finished}$, and a set of all the subtasks in the application program, $T^{task}$;

initially, $\phi^{entry}$ subtasks are placed into $Q^{ready}$ from the set $T^{task}$, the tasks in $Q^{ready}$ are sorted in ascending order according to the subtask priority determination formula, a front element of the queue is removed to place the tasks into the queue $Q^{exe}$ of executing the subtasks, and if there are the completed tasks in the queue $Q^{exe}$, the completed tasks are placed into the $Q^{finished}$ queue; this may generate new ready subtasks, and if all the predecessor node subtasks of the subtask $\phi_i$ in the set $T^{task}$ are in the queue $Q^{finished}$, the subtask $\phi_i$ becomes the ready subtask, and is placed in the queue $Q^{ready}$, and the above steps are repeated until the set $T^{task}$ is empty; in the whole process of the subtask priority determination, the ready subtasks are dynamically determined according to execution results of the predecessor subtasks, and then the priority of the ready subtasks is determined.

9. The method of optimizing dependent task offloading in an Internet of Vehicles using deep reinforcement learning according to claim 8, wherein S5 comprises the following steps:

S501: initializing an experience replay buffer and defining a maximum number of the execution and initial episodes;

S502: initializing parameters $\mu$ l and $\theta$ of current actor and current critic after initializing the experience replay buffer;

S503: initializing a parameter $\mu' \leftarrow \mu$ of target actor and a parameter $\theta' \leftarrow \theta$ of target critic separately;

S504: obtaining an initial environment state $s_t$ and preparing an initial random noise $n_t$ for action exploration;

S505: obtaining an action $a_t$ from time t=1 until t=n based on output of an Actor-C network of a current network and the random noise $n_t$:

$$a_t = \varphi_\mu(s_t) + n_t, \quad (29)$$

wherein n represents a number of indivisible subtasks in the application program;

S506: executing the action $a_t$, obtaining reward $r_t$, and changing the environment state to $s_{t+1}$;

S507: storing $(s_t, a_t, r_t, s_{t+1})$ in the experience replay buffer, and offline training by using historical data in the experience replay buffer to improve stability and robustness of the model;

S508: sampling N tuples $\{(s_t, a_t, r_t, s_{t+1})\}$ from the experience replay buffer for training a target network and updating the current network;

S509: calculating the target value for each of the tuples $y_t$ by using the target network, wherein $y_t$ is a value related to the current state $s_t$ and the action $a_t$, $y_t$ comprises the current reward $r_t$ and a target predicted value of a next state $s_{t+1}$, and the target value is calculated using a following formula:

$$y_t = r_t + \gamma \vartheta_{\theta'}(s_{t+1}, \varphi_{\mu'}(s_{t+1})), \tag{30}$$

wherein $\gamma$ is a discount factor, $\vartheta_{\theta'}$ is the target critic, $\varphi_{\mu'}$ is the target actor, and these network parameters are initialized in S503;

S510: updating the parameter $\theta$ of the current critic by minimizing target loss $L(\theta)$, wherein $L(\theta)$ is calculated from a mean squared error (MSE) loss function as follows:

$$L(\theta) = \frac{1}{N}\sum_{i=1}^{N}(y_i - \vartheta_\theta(s_i, a_i|\theta)^2), \tag{31}$$

wherein N is a number of the tuples sampled from the experience replay buffer, $y_i$ is the target value, and $\vartheta_\theta(s_i, a_i|\theta)$ is an output value of the current critic;

S511: updating the Actor network of the current network by calculating a sampled policy gradient, wherein $Q(s, a|\theta)$ represents predicted values of the current critic for the state s and the action a, $\nabla_a Q(s, a|\theta)$ represents an action gradient on the predicted values, $\varphi_u(s|\mu)$ represents action output of the current actor network for the state s, $\nabla_u \varphi_u(s|\mu)$ represents a parameter gradient for the action output, and a calculation formula for the strategy gradient is a Monte Carlo method, and estimates expected values using sampled tuple data:

$$\nabla_u J \approx \frac{1}{N}\sum_{i=1}^{N}(\nabla_a Q(s, a|\theta)|_{s=s_i, a=\varphi_u(s_i)} \cdot \nabla_u \varphi_u(s|\mu)|_{s=s_i}); \tag{32}$$

S512: if current iterative times t are divided by C, that is, t % C=0, updating the network parameters, wherein $\theta'$ and u' respectively represent the parameter of the target critic and the parameter the target actor, and v is a hyperparameter less than 1 used for smoothly updating:

$$\theta' = v\theta + (1-v)\theta', \tag{33}$$

$$u' = vu + (1-v)u', \tag{34}$$

S513: t=t+1, repeating S505 to S512;

S514: if the current iterative times t is equal to n, that is, the maximum number of the execution is reached, episode=episode+1; then repeating S504 to S513 until the training process is complete, and obtaining an optimal offloading strategy.

* * * * *